United States Patent [19]

Forney, Jr.

[11] 4,343,041
[45] Aug. 3, 1982

[54] MODEM CIRCUITRY

[75] Inventor: George D. Forney, Jr., Cambridge, Mass.

[73] Assignee: Codex Corporation, Mansfield, Mass.

[21] Appl. No.: 136,754

[22] Filed: Apr. 3, 1980

[51] Int. Cl.³ ............................................... H04B 3/14
[52] U.S. Cl. .......................................... 375/14; 333/18
[58] Field of Search ................................... 375/11–16; 333/18, 28 R; 328/167

[56] References Cited

U.S. PATENT DOCUMENTS 3,697,689 10/1972 Gibson .................................... 374/14
3,723,911 3/1973 Forney .................................... 333/18
3,935,535 1/1976 Motley .................................... 375/13

Primary Examiner—Benedict V. Safourek
Assistant Examiner—Stephen Chin

[57] ABSTRACT

Modem receiver apparatus having circuitry for automatically adaptively equalizing received signals, including equalizer updating circuitry for updating coefficients stored in the equalizer, wherein the apparatus comprises circuitry for detecting the duration of periodicity in the received signals, circuitry for comparing the duration to a threshold, and circuitry for freezing the updating circuitry when the duration exceeds the threshold and for otherwise releasing the updating circuitry to permit updating of the coefficients.

3 Claims, 4 Drawing Figures

MODEM CIRCUITRY

BACKGROUND OF THE INVENTION

This invention relates to modem receiver apparatus in which a modulated carrier signal represents digital bits.

Modems having adaptive equalizers tend to develop arbitrary coefficients in the presence of long strings of repetitive bits.

SUMMARY OF THE INVENTION

In general the invention features modem receiver apparatus having circuitry for automatically adaptively equalizing received signals, including equalizer updating circuitry for updating coefficients stored in the equalizer, wherein the apparatus comprises means for detecting the duration of periodicity in the received signals, means for comparing the duration to a threshold, and means for freezing the updating circuitry when the duration exceeds the threshold, and for otherwise releasing the updating circuitry to permit updating of the coefficients.

In preferred embodiments, the means for detecting also includes decision circuitry for generating a sequence of decision values for each of a sequence of received signals and means for counting successive equalities between decision values spaced by a predetermined number of positions in the sequence; and the equalizer circuitry has adjustable taps and the predetermined number is no greater than the number of the taps.

Other advantages and features will appear from the following description of the preferred embodiment, and in the claims.

DESCRIPTION OF THE PREFERRED EMBODIMENT

We first briefly describe the drawings.

Drawings

STRUCTURE

Figure 1:
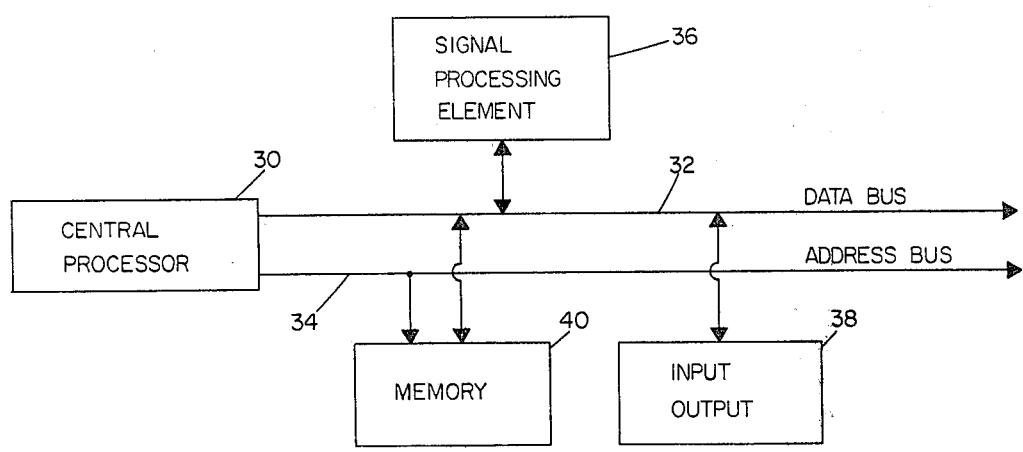
FIG. 1 is a general block diagram of a receiver embodying the invention.

Referring to FIG. 1, the receiver has a central microprocessor (MPU) 30 (the Motorola 68B00 general purpose microprocessor chip), connected to data bus 32 and address bus 34. Signal processor element (SPE) 36 and input/output circuitry 38 are also connected to bus 32. MPU memory 40 is connected to both buses.

Figure 2:
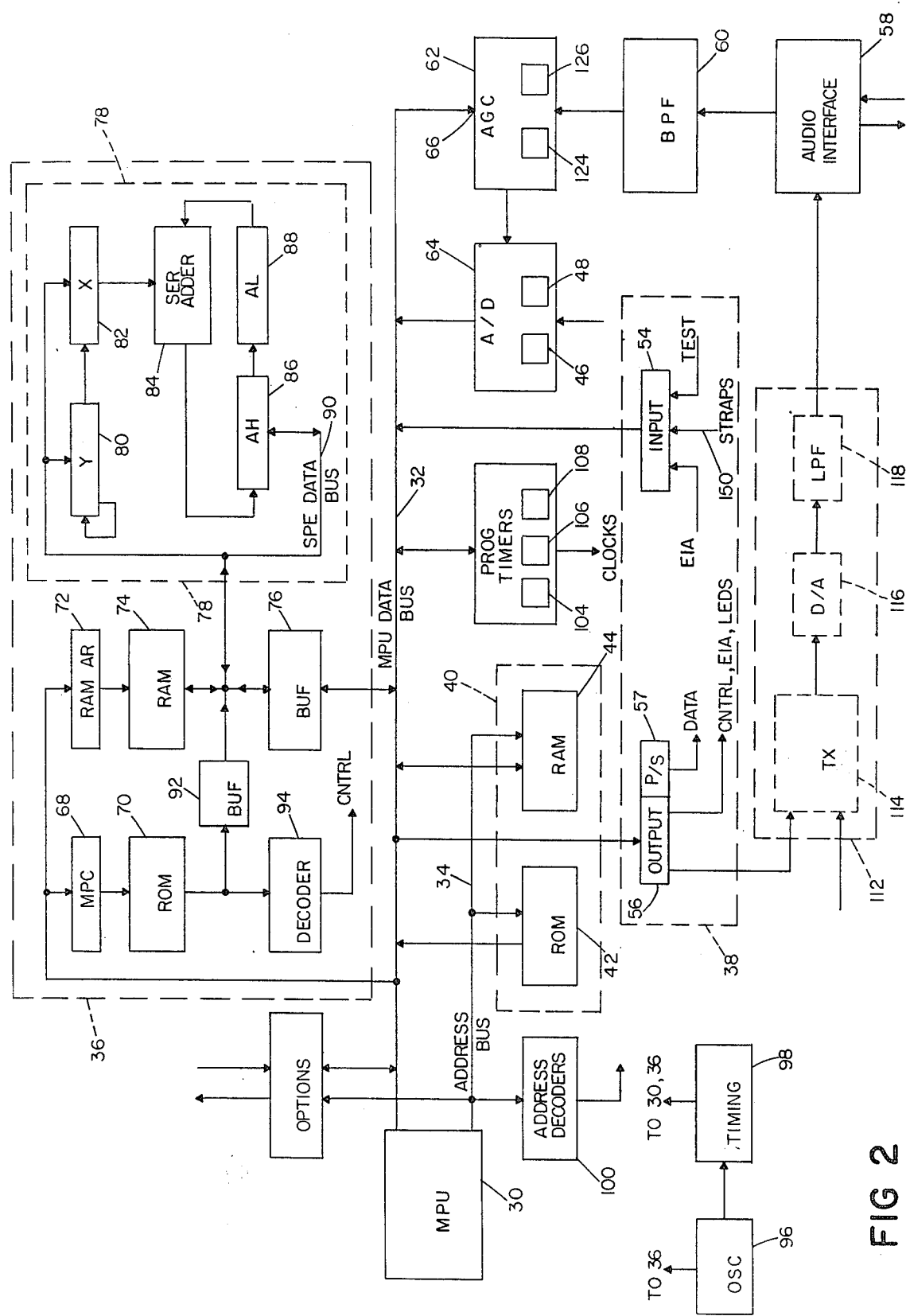
FIG. 2 is a more detailed block diagram of the receiver.

Referring now to FIG. 2, MPU 30 has a 4K×8 bit ROM program memory 42, from which MPU 30 executes instructions, and a 256×8 bit RAM data memory 44. MPU 30 interfaces with conventional data terminal equipment and the modem front panel (straps, test switches, indicators), through input and output registers 54 and 56.

Audio interface 58, band pass filter 60, AGC element 62, and A/D converter 64 are arranged to initially process received signals and put them on data bus 32. Bus 32 also has a control connection 66 directly to element 62.

Converter 64 has a sample-and-hold circuit 46 clocked at 7200 samples/sec., and an 8 bit A/D element 48.

AGC element 62 consists of an 8 bit latch 124 connected to multiplying D/A converter 126. Latch 124 is arranged to receive a coarse gain control signal g from MPU 30, once during each symbol interval and to pass g to multiplying D/A converter 126, thus producing an output voltage $v_{out}$ proportional to the product of g and input voltage $v_{in}$.

SPE 36 is an independent, programmable digital processor which is loosely coupled to, and executes tasks under the control of, MPU 30. Three elements of SPE 36 are connected to data bus 32: microprogram counter (MPC) 68, which can be loaded by MPU 30 and determines the next instruction address in 1K×8 bit ROM program memory 70 for SPE 36; random access memory address register (RAM AR) 72, which can also be loaded by MPU 30 and points to the operand in 256×8 bit data memory 74; and 8 bit read/write buffer 76, through which MPU 30 and SPE 36 can exchange data.

Arithmetic unit 78, in SPE 36, has two 8 bit registers, Y register 80 and X register 82; a serial adder 84 which can receive, in sequence, the data stored in X register 82; and two bit 8 accumulators, "high" accumulator AH 86 which stores the 8 most significant bits of a 16 bit numer and "low" accumulator AL 88 which stores the remaining 8 bits. Y register 80, X register 82, and AH 86 are all connected through SPE data bus 90 to SPE data memory 74, read/write buffer 76, and intermediate buffer 92. Intermediate buffer 92 is in turn connected to SPE program memory 70.

SPE 36 also has an instruction register decoder 94 connected to SPE program memory 70.

Crystal oscillator 96 generates a 7.3728 MHz clock signal which is provided to SPE 36 and to frequency division circuitry 98. The output of frequency division circuitry 98 is a 1.8432 MHz clock signal which is provided to MPU 30.

Address decoders 100 connect with all components connected to MPU data bus 32.

Three programmable timers 104, 106, and 108 are provided. Timer 104 is frequency controlled by MPU 30 and generates an adjusted clock from which a sample clock signal for A/D converter 64 as well as a receive bit-rate clock signal for the terminal are derived. Timer 106, also frequency controlled by MPU 30, generates and supplies to MPU 30 a software timing clock. Timer 108 is in communication only with MPU 30, can be reset to a predetermined time interval by MPU 30, and serves a "watchdog" function described below.

Shown in phantom in FIG. 2 are elements that participate in the modem transmitter: LSI transmitter chip (e.g., Motorola Part Number 6862) 114, D/A converter 116, and low pass filter 118, connected between output register 56 and audio interface 58.

Figure 3:
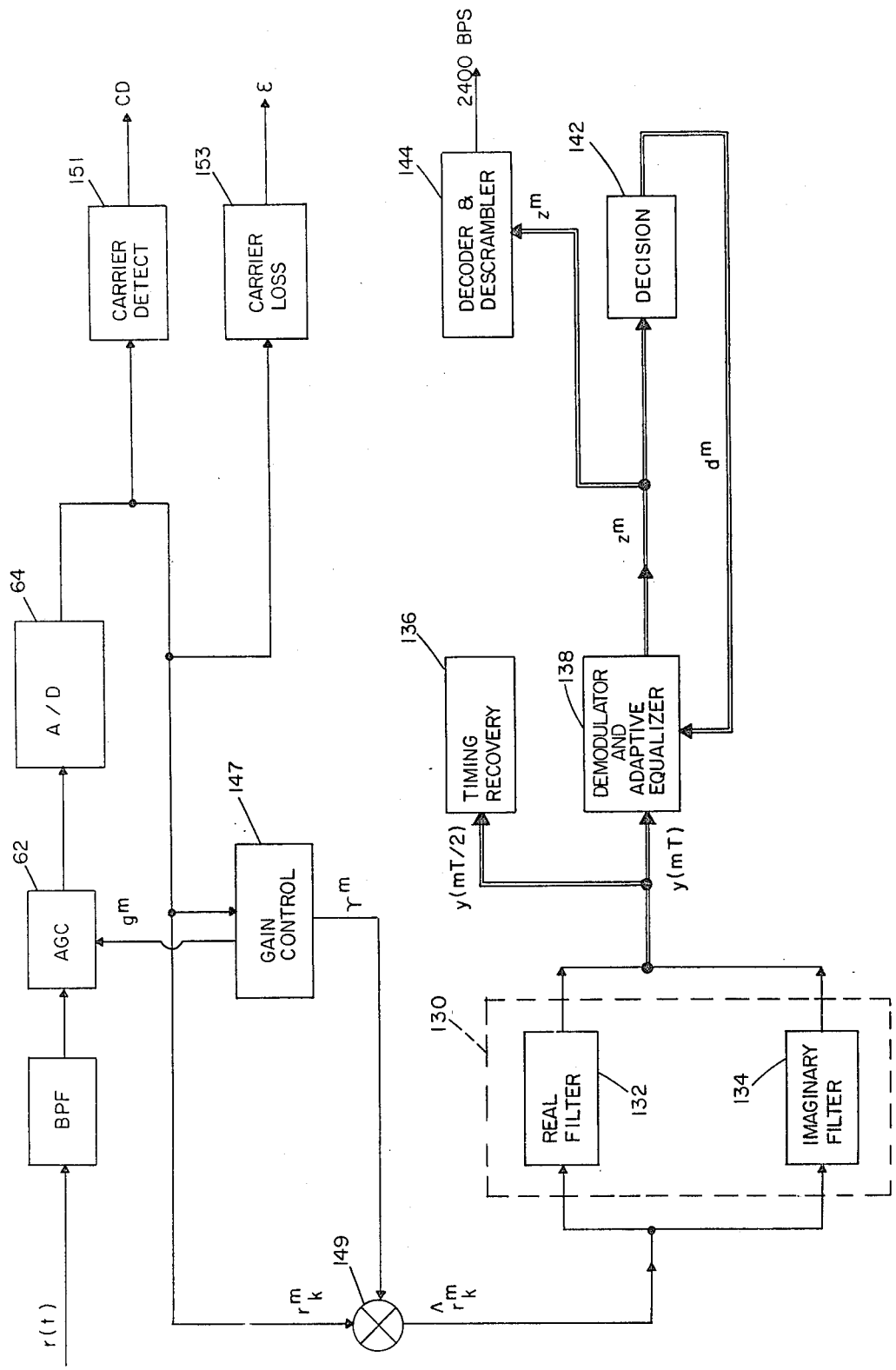
FIG. 3 is a block diagram illustrating procedures carried out by microprocessor circuitry in the receiver.

MPU 30 and SPE 36 are programmed to effect the further modem "circuits" shown generally in FIG. 3. In particular, there is effected a non-recursive, digital, phase splitting "filter" 130, with real and imaginary parts 132 and 134, which receives the output of A/D converter 64, after scaling via "multiplier" 149, and provides filtered outputs to timing recovery "circuit" 136 (at 2400 samples/sec., twice the baud rate) and to demodulation and adaptive equalization circuitry 138 (at 1200 samples/sec., the baud rate). The demodulated and equalized signal $z^m$ is passed to decision "circuit" 142, which in turn feeds "decoder/descrambler" 144 to provide a 2400 bps digital output. The output $d^m$ of decision circuit 142 is provided to circuit 138 for use in adjusting the demodulator carrier phase and frequency and updating the adaptive equalizer coefficients.

Gain control "circuit" 147, depending on the strength of signals received from converter 64, provides coarse gain control factor g to AGC element 62 and fine gain control factor γ to multiplier 149, located within SPE 36. Carrier detect "circuit" 151 and carrier loss "circuit" 153 monitor the strength of signals from converter 64 to determine if a data transmission has begun or terminated.

Further details of how MPU 30 and SPE 36 effect those modem "circuits" and their functions appear in a copending U.S. Patent Application Ser. No. 136,921 entitled "Modem Circuitry", filed by Shahid Qureshi on the same day as this application and hereby incorporated by reference.

OPERATION

In general, the modem, while on line, monitors the average strength of the signal samples produced by A/D converter 64 at a rate of 7,200 times per second. When a preselected threshold strength is exceeded, MPU 30 raises a carrier detect condition and sets an initial gain factor g for AGC 62. With carrier detected and gain initialized, the receiver enters a timing jam mode in which one out of six consecutive samples produced by A/D converter 64 is selected by MPU 30 for equalization and demodulation. Thereafter the tap coefficients of the equalizer are set to initial values.

The above steps completed, the receiver enters a data mode, wherein the AGC, timing rate, carrier phase, and equalizer tap coefficients are continually updated. The average signal strength is also continually computed; when it falls below a preselected carrier-off threshold, a carrier loss signal is raised, taking the modem out of data mode.

Further details of overall operation appear in the above-identified copending application. Aspects of the operation relating to the invention claimed herein are as follows.

The modem has a Bell 201-compatible mode in which the data is not scrambled and descrambled. In this mode, equalizer 138 may develop arbitrary coefficients in the presence of long strings of repetitive dibits. Rather than allow the coefficients to wander in this condition, it is preferable to freeze them at whatever value they have when periodicity is detected.

Figure 4:
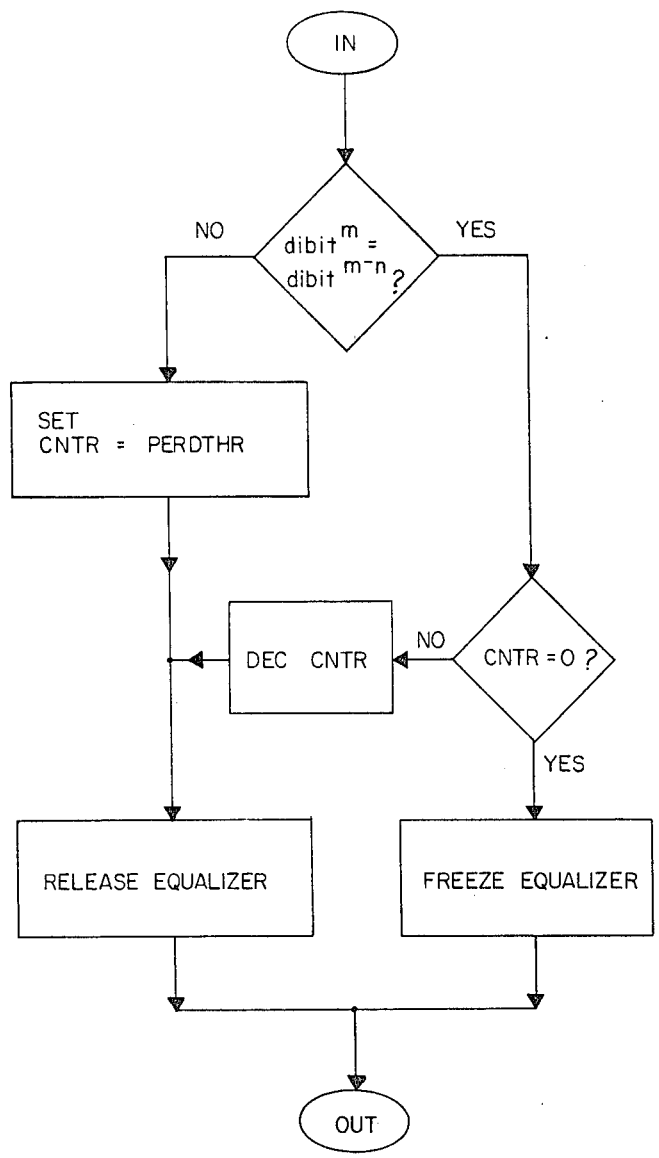
FIG. 4 is a flow chart of an equalizer freeze procedure carried out by microprocessor circuitry in the receiver.

The receiver accomplishes this by implementing an equalizer freeze algorithm shown in flow chart form in FIG. 4. Each symbol period the decoded dibit corresponding to $d^m$ is compared for identity to the earlier decoded dibit corresponding to $d^{m-n}$. If the earlier and later dibits are nonidentical, a counter in memory 44 is set to PERDTHR (i.e., the periodicity threshold which is the number of repeated dibits at which it is desired to freeze the equalizer coefficients) and a "release equalizer" signal is sent to SPE 36. If the earlier and later dibits are identical the counter is then tested for equality to zero. If the value of the counter is nonzero, the counter is decremented and a "release equalizer" signal is sent to SPE 36, but, if the value of the counter is zero, a "freeze equalizer" signal is sent to SPE 36.

The constant n, here 4, should, in general, be no greater than the number of taps in equalizer 138.

Other embodiments are within the following claims.

I claim:

1. Modem receiver apparatus having circuitry for automatically adaptively equalizing received signals, including equalizer updating circuitry for updating coefficients stored in the equalizer, wherein said apparatus comprises
    means for detecting the duration of periodicity in said received signals,
    means for comparing said duration of periodicity to a threshold, and
    means for freezing said updating circuitry when said duration exceeds said threshold, and for otherwise releasing said updating circuitry to permit updating of said coefficients.

2. The apparatus of claim 1 wherein said modem receiver apparatus includes decision circuitry for generating a sequence of decision values for each of a sequence of received signals, and said means for detecting comprises means for counting successive equalities between decision values spaced by a predetermined number of positions in said sequence.

3. The apparatus of claim 2 wherein said equalizer circuitry has adjustable taps and said predetermined number is no greater than the number of said adjustable taps.

* * * * *